United States Patent
Dohi et al.

(10) Patent No.: US 6,341,224 B1
(45) Date of Patent: *Jan. 22, 2002

(54) POWER CONTROLLER FOR MOBILE COMMUNICATION SYSTEM WHEREIN A SIGNAL TO INTERFERENCE THRESHOLD IS DYNAMICALLY MOVED BASED ON AN ERROR RATE MEASUREMENT

(75) Inventors: Tomohiro Dohi; Syunsuke Seo; Yukihiko Okumura; Mamoru Sawahashi, all of Yokohama (JP)

(73) Assignee: NTT Mobile Communications Network, Inc., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/029,534

(22) PCT Filed: Jun. 26, 1997

(86) PCT No.: PCT/JP97/02215

§ 371 Date: Feb. 27, 1998

§ 102(e) Date: Feb. 27, 1998

(87) PCT Pub. No.: WO97/50197

PCT Pub. Date: Dec. 31, 1997

(30) Foreign Application Priority Data

Jun. 27, 1996 (JP) .............................................. 8-167054

(51) Int. Cl.[7] .................................................. H04B 1/00
(52) U.S. Cl. .......................................... 455/522; 455/70
(58) Field of Search ................................ 455/423, 522, 455/127, 70, 453, 452

(56) References Cited

U.S. PATENT DOCUMENTS

| 4,777,653 | A | | 10/1988 | Bonnero et al. ............... 455/69 |
|---|---|---|---|---|
| 5,333,175 | A | * | 7/1994 | Ariyavisitakul .............. 379/58 |
| 5,386,588 | A | * | 1/1995 | Yasuda ....................... 455/33.1 |
| 5,386,589 | A | * | 1/1995 | Kanai ......................... 455/33.1 |
| 5,434,798 | A | * | 7/1995 | Madebrink ................... 364/514 |
| 5,570,343 | A | * | 10/1996 | Bishop ........................ 370/16 |
| 5,574,984 | A | * | 11/1996 | Reed ............................ 455/69 |
| 5,623,484 | A | * | 4/1997 | Muszynski ................... 370/335 |
| 5,634,195 | A | * | 5/1997 | Sawyer ....................... 455/54.1 |
| 5,710,981 | A | * | 1/1998 | Kim ............................. 455/69 |
| 5,768,260 | A | * | 6/1998 | Lindgren .................... 370/252 |
| 5,774,785 | A | * | 6/1998 | Karlsson .................... 455/522 |
| 6,137,840 | A | * | 10/2000 | Tiedemann ................. 375/297 |

FOREIGN PATENT DOCUMENTS

| EP | 548939 | 6/1993 | |
|---|---|---|---|
| EP | 07099731 A1 | * 1/1996 | ................. 455/38.1 |
| EP | 709973 | 5/1996 | |
| JP | 3-267832 | 11/1991 | |
| JP | 7-30482 | 1/1995 | |
| WO | WO 9418756 | 8/1994 | |

* cited by examiner

Primary Examiner—Daniel Hunter
Assistant Examiner—Nick Corsaro
(74) Attorney, Agent, or Firm—Brown Raysman Millstein Felder & Steiner LLP

(57) ABSTRACT

An error rate of received signal is measured by a received signal error measuring unit 32, and a target SIR is changed by a target SIR decision unit using the error rate. It is also possible to detect error rate of received signal in an unit of frame using a CRC signal of a frame. It is further possible to detect error rate of received signal by detecting errors of known pilot signals inserted in a constant interval.

10 Claims, 4 Drawing Sheets

POWER CONTROLLER FOR MOBILE COMMUNICATION SYSTEM WHEREIN A SIGNAL TO INTERFERENCE THRESHOLD IS DYNAMICALLY MOVED BASED ON AN ERROR RATE MEASUREMENT

FIELD OF THE INVENTION

The present invention relates to a transmission power controller used in digital telecommunications, particularly in mobile communications applied with a code division multiple access (CDMA) system.

BACKGROUND ART

In a CDMA system, since the same frequency band is used by a plurality of communicators, signals of other communicators become interference signals which degrade communication quality of own channel. When a mobile station near the base station and a mobile station far from the base station make communication simultaneously, transmission signal from the near mobile station is received at a high power at the base station.

Therefore, a problem occurs in that communication between a far mobile station and the base station is interfered in by a near mobile station resulting in a considerable degradation of channel quality, that is, a near-far problem. As a technology for solving the near-far problem, studies have heretofore been conducted for transmission power control. Transmission power control is for controlling the transmission power so that a reception power received by the receiving station, or a signal-to-interference plus noise power ratio (SIR) obtained from the received power is constant irrespective of the location of the mobile station, thereby obtaining an uniform channel quality within the service area. In particular, for an uplink channel, transmission power control of respective mobile stations is performed at the base station reception end so that received power of transmission signal from each mobile station or SIR is constant. In a CDMA system where interference signals from other communicators are regarded as white noise, a large number of other communicators correspond equivalently to an increased noise power and, in this case, a subscriber capacity within the same cell depends on received SIR which can obtain predetermined channel quality.

For a downlink, on the other hand, since signal of own channel and interfering signals of other communicators pass through the same transmission route, long-term variations, short-term variations, instantaneous variations, and the like are the same variations as the own channel signal, and always constant in received SIR except for noise power.

Therefore, transmission power control is needless when handling only interference in the same cell. However, in a CDMA of whitened interference, an adjacent cell also makes communication using the same frequency band, interference from other cells must be considered. Interference power from another cell is same instantaneous variation by Rayleigh fading as interference power within the cell, however, since it is not the same variation as the desired signal of own station, transmission power control is required which follows up instantaneous variation.

As a transmission power control system which follows up instantaneous variation, there is a transmission power control system by closed loop using a transmission power control bit. When a base station is communicating with a mobile station within the cell of the base station, the mobile station measures received SIR of the desired wave from the base station, and determines a transmission power control bit for controlling transmission power of the base station according to the measurement result. The mobile station inserts the transmission power control bit in the transmission signal and transmits it to the base station. The base station receives the signal transmitted from the mobile station, extracts the transmission control bit, and determines the transmission power according to instruction of the transmission power control bit. Further, the base station measures received SIR of the desired wave from the mobile station, and determines a transmission power control bit for controlling transmission power of the mobile station according to the measurement result. The base station inserts the transmission power control bit in the transmission signal and transmits it to the mobile station. The mobile station receives the signal transmitted from the base station, extracts the transmission power control bit, and determines the transmission power according to instruction of the transmission power control bit.

Object of making transmission power control is for maintaining channel quality (FER: frame error rate, or BER: bit error rate) of the channel in a predetermined quality.

FIG. 1 shows the relationship between the maximum Doppler frequency and received SIR required for attaining a predetermined channel quality using the number of multipaths as a parameter. Received SIR required for attaining a predetermined channel quality varies with propagation environment such as moving speed of the mobile station, that is, the maximum Doppler frequency of fading, number of multipaths, and the like. Therefore, in prior art transmission power control based on received SIR measurement, there has been a problem in that it is necessary to set a received SIR when giving a propagation environment of worst channel quality, and transmission is made at an excessively high transmission power even in a propagation environment of good characteristics. Further, there has also been a problem in that, when measurement accuracy of received SIR is low, since transmission power control is made according to a wrong measurement result, transmission cannot be made at a proper transmission power.

DISCLOSURE OF THE INVENTION

With the aim of solving the above problems, an object of the present invention is to achieve transmission power control which provides consistent channel quality irrespective of propagation environment or received SIR measurement accuracy.

There is provided a transmission power controller of at least one of a base station and a mobile station in a mobile communication system including the base station and the mobile station, characterized by comprising:

means for measuring a received SIR (signal-to-interference plus noise power ratio);

means for comparing a measurement result of the received SIR with a predetermined target value of SIR;

means for outputting transmission power control information to an opposing station according to the comparison result;

means for receiving and demodulating the transmission power control information transmitted from opposing station;

means for controlling transmission power of own station according to the demodulated transmission power control information;

error/rate measuring means for measuring an error rate of received signal; and means for changing the SIR target value according to measurement of the received signal error rate.

Here, the error rate measuring means may comprise:

means for detecting presence of a frame error by detecting a CRC (cyclic redundancy check) bit added to wireless frame signal;

means for counting the number of the frame errors in an optional measuring time; and means for comparing the number of measured frame errors with a predetermined frame error number setting value.

The error rate measuring means may comprise:

means for detecting presence of a frame error by detecting a CRC bit added to wireless frame signal;

means for determining a moving average of errors in an optional number of frames using the frame errors; and means for comparing moving average of the measured errors with a predetermined setting value of frame errors independently of period of the optional number of frames.

The means for changing the received SIR target value:

may make an instruction to decrease the SIR target value by a predetermined step width when number of measured frame errors or a moving average thereof is smaller than a setting value, and may make an instruction to increase the SIR target value by a predetermined step width when the number of frame errors or a moving average thereof is greater than a setting value.

The error rate measuring means may comprise:

means for detecting bit errors of known pilot signals inserted at a predetermined interval in wireless frame;

means for counting the number of bit errors in an optional measuring time; and means for comparing the measured number of bit errors with a predetermined bit error number setting value.

The error rate measuring means may comprise:

means for detecting bit errors of pilot signals inserted at a predetermined interval in wireless frame signal;

means for determining a moving average of bit errors in an optional period using the bit errors; and means for comparing moving average of the measured errors with a predetermined setting value of bit errors independently of the optional period.

The means for changing the received SIR target value:

may make an instruction to decrease the SIR target value by a predetermined step width when number of bit errors in measured pilot signals or a moving average thereof is smaller than a setting value, and may make an instruction to increase the SIR target value by a predetermined step width when the number of bit errors or a moving average thereof is greater than a setting value.

As described above, since FER or BER is measured to change a target value of received SIR, transmission power control can be performed without influence of measurement accuracy of received SIR.

BEST MODE FOR PRACTICING THE INVENTION

Embodiments of the present invention will be described with reference to the drawings.

Figure 1:
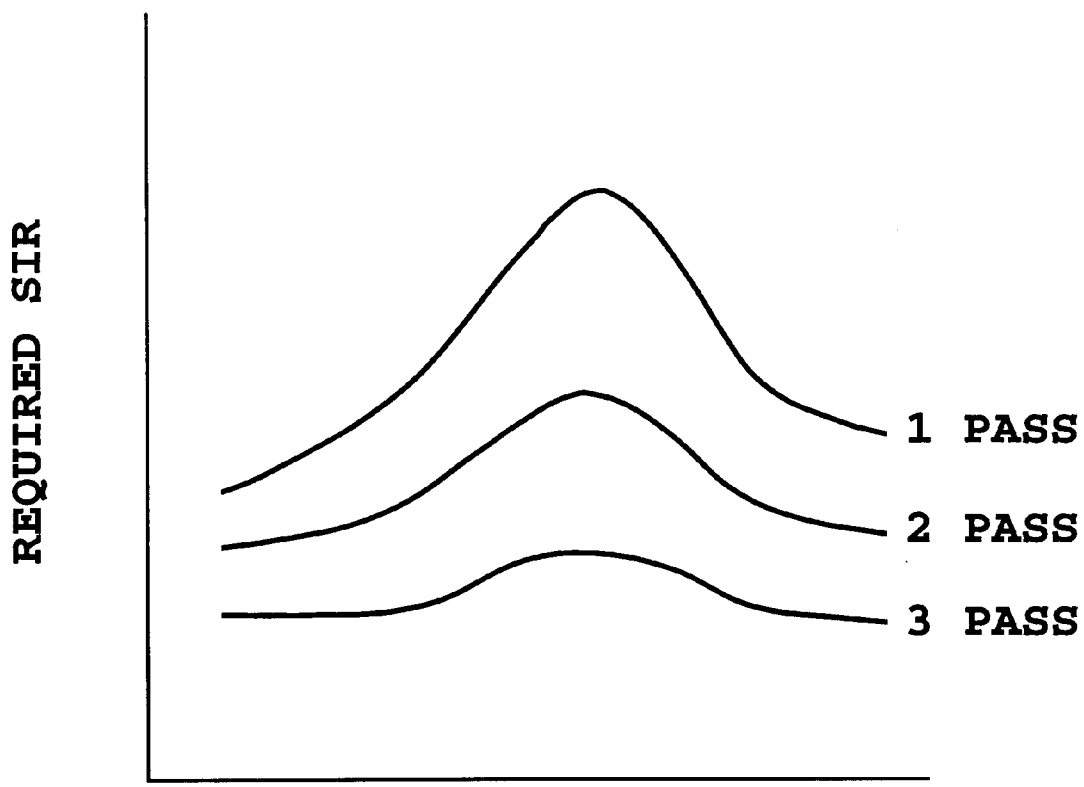
FIG. 1 is a graph showing the relationship between maximum Doppler frequency and received SIR required for attaining a predetermined channel quality using the number of multipaths as a parameter.
Figure 2:
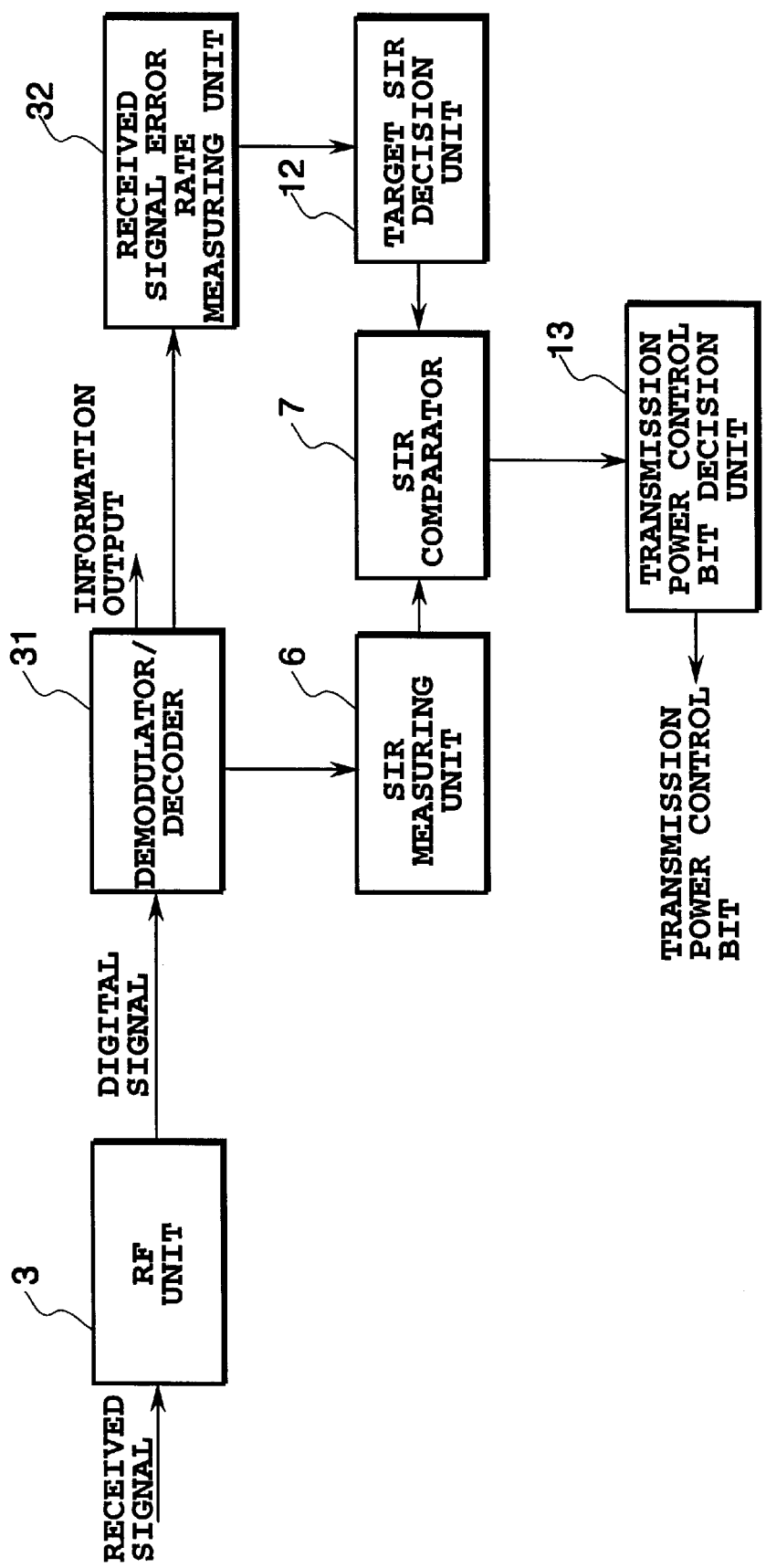
FIG. 2 is a diagram for explaining the principle of the transmission power controller according to the present invention.

The principle of the present invention will be described using FIG. 2. FIG. 2 is a block diagram of part of a transmitter/receiver related to the present invention in a base station or a mobile station in a mobile communications system.

In FIG. 2, received signal is caused to be a baseband signal in an RF unit 3, and then A/D converted to a digital signal. The digital signal is subjected to processing such as despreading or the like in a demodulator/decoder 31 to be decoded into digital information.

Using the signal from the demodulator/decoder 31, a Signal-to Interference plus Noise power Ratio (SIR) is measured in a SIR measuring unit 6. Received SIR as a measured value from the SIR measuring unit 6 is compared in a comparator 7 with a target SIR from a target SIR decision unit. As a result, when the received SIR is smaller than the target SIR, a control bit for instructing an increase of transmission power is generated from a transmission power control bit decision unit 13, and when the received SIR is greater than the target SIR, a transmission power control bit for instructing a decrease of transmission power is generated. The generated transmission power control bit is transmitted to the object station to control transmission power of the object station. This control is the same as prior art transmission power control. In the present invention, an error rate of received signal is measured by a received signal error rate measuring unit 32, and the target SIR is changed by the error rate in the target SIR decision unit 12. Error of the received signal can be detected for error rate of received signal in an unit of frame using a CRC signal which is an error detection code in an unit of frame being sent. Further, by detecting error of known pilot signal inserted in a constant period, error rate of the received signal can also be detected.

Figure 3:
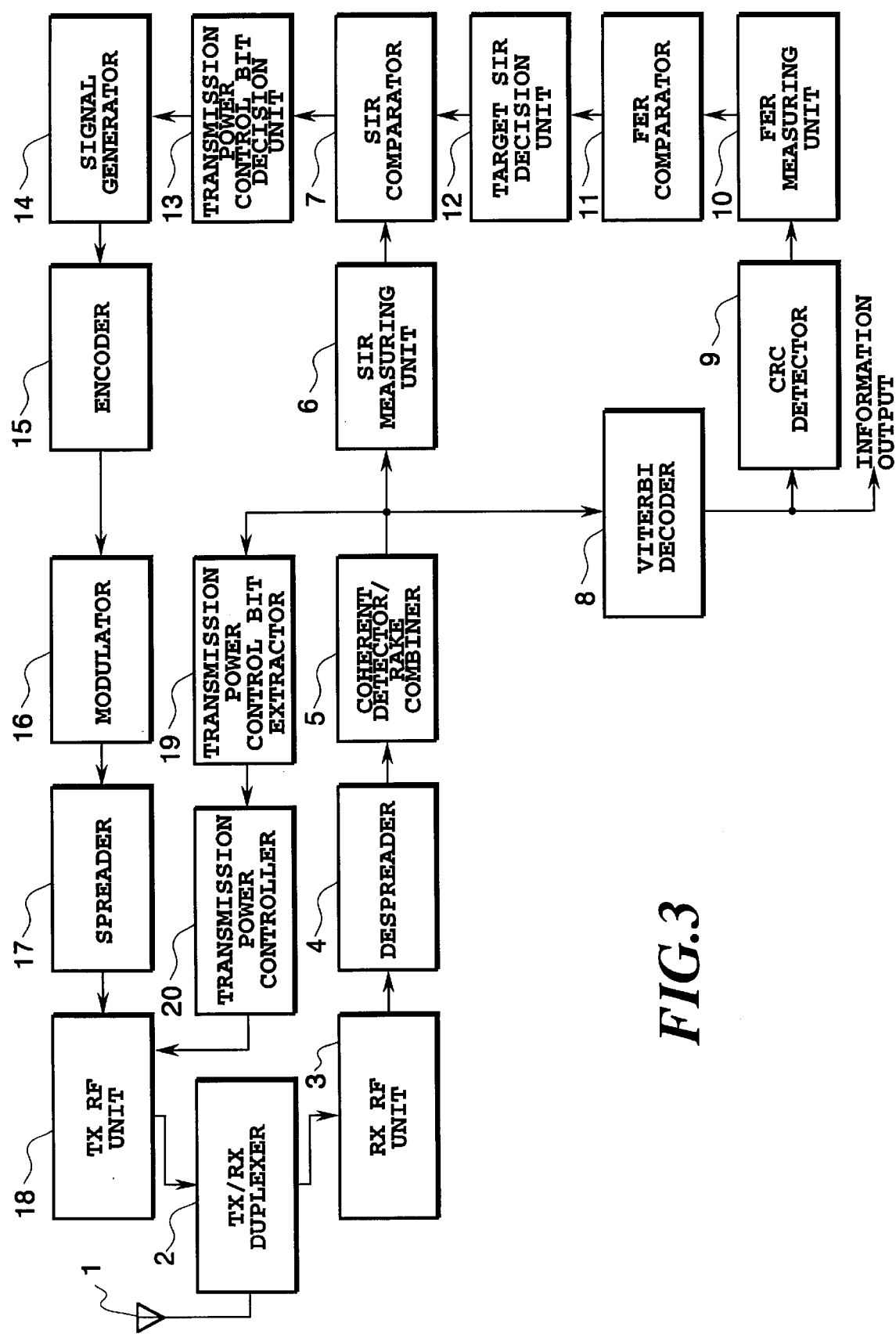
FIG. 3 is a diagram showing an embodiment of the transmission power controller.

FIG. 3 shows an embodiment of transmitter/receiver apparatus incorporating the transmission power controller of the present invention.

In FIG. 3, reference numeral 1 indicates an antenna, 2 is a TX RX duplexer, 3 is an RX RF unit, 4 is a despreader, 5 is a coherent detector/RAKE combiner, 6 is an SIR measuring unit, 7 is an SIR comparator, 8 is a Viterbi decoder, 9 is a CRC detector, 10 is an FER measuring unit, 11 is an FER comparator, 12 is a target SIR decision unit, 13 is a transmission power control bit decision unit, 14 is a signal generator, 15 is an encoder, 16 is a modulator, 17 is a spreader, 18 is a TX RF unit, 19 is a transmission power control bit extractor, and 20 is a transmission power controller.

Next, operation when the present apparatus is used as a mobile station will be described. Spectrum spread signal transmitted from the base station is received by the antenna 1. The received signal passes through the TX/RX duplexer 2 and is inputted in the RX RF unit 3. In the RX RF unit 3, the received signal is passed through a bandpass filter (BPF) to remove out-of-band components, and then frequency converted to an intermediate frequency band (IF band) by a clock generated by a local oscillator. After the received signal which is frequency converted to IF band is passed through a BPF, the received signal is corrected to an appropriate signal level by an automatic gain controller (AGC), quadrature detected, and then frequency converted to a baseband. The received signal which is frequency converted into baseband, after being passed through a low pass filter (LPF), is analog/digital (A/D) converted into a digital signal which is outputted.

The digital signal outputted from the RX RF unit 3 is despread in the despreader 4, and outputted as a narrow band modulated signal. Signal outputted from the despreader 4 is demodulated in the coherent detector/RAKE combiner 5 to be RAKE combined, and in the SIR measuring unit 6, measured for received SIR at every predetermined measurement period. Further, transmission power control bit is extracted in the transmission power control bit extractor 19 and outputted to the transmission power controller 20.

In the transmission power controller 20, transmission power is determined according to the transmission power control bit, and control information is outputted to the TX RF unit 18. Still further, the received signal which is demodulated in the coherent detector/RAKE combiner 5, the RAKE combined received signal is Viterbi decoded by the Viterbi decoder, and outputted as an information signal. A CRC bit is detected by the CRC detector 9 from the Viterbi decoded information signal. When CRC bit is not detected, a frame error detection signal is outputted to the FER measuring unit 10.

In the FER measuring unit 10, the number of frame errors is counted in an optional period (much longer than SIR measuring period in the SIR measuring unit 6), and FER measurement result is outputted to the FER comparator 11. In the FER measuring unit 10, an average of frame error rate in a certain period is measured. In the FER comparator 11, a comparison is made with a predetermined target FER. When the measured FER value is smaller than the target FER, the FER comparator makes an instruction to the target SIR decision unit 12 to decrease the target SIR, and when the measured FER value is greater than the target FER, the FER comparator 11 instructs the target SIR decision unit 12 to increase the target SIR.

Measurements in the FER measuring unit 10 are averaged at every constant period to obtain a measurement result. However, by using moving average in FER measurement, averaging time to determine FER and target SIR control period can be made asynchronous with one another.

The moving average of FER is given by $$FER(n) = \alpha \times FER(n-1) + (1-\alpha)ERR.$$

wherein n is a frame number, $\alpha$ is a forgetting factor, and ERR is a CRC measurement result, that is, it is 0 when the present n'th frame is normally detected, and 1 for error.

Therefore, in the above FER moving aver age equation, when it is assumed as $$\alpha = 0.9,$$

CRC measurement of the present frame is added with an weight of 0.1, thereby obtaining the moving averaged FER. This corresponds to determination of moving average of 10 frames moved by every 1 frame.

As described above, by making measurement of the FER measuring unit 10 according to the concept of moving average, control of the SIR target value can be determined independent of averaging period. Therefore, for example, it is possible to determine FER by setting the average of 1000 frames as $$\alpha = 0.999,$$

and make SIR target value setting control at every 100 frames.

When the target SIR is changed, in addition to a dynamic changing method of the target value, it is also possible to increase or decrease by only a predetermined step width. In this case, when measured value of FER in the FER comparator 11 is smaller than the target FER, an instruction is made to the target SIR decision unit 12 to decrease the target SIR by a predetermined value (step width), and when the FER measured value is greater than the target FER, an instruction is made to the target SIR decision unit 12 to increase the target SIR by the predetermined value (step width).

In the SIR comparator 7, the target SIR updated at every FER period is compared with received SIR measured in the SIR measuring unit 6 and, according to the comparison result, the transmission power control bit decision unit 13 generates a control bit to instruct an increase of transmission power when the received SIR is smaller than the target SIR, or a control bit to instruct a decrease of the transmission power when the received SIR is greater than the target SIR, and outputs the control bit to the signal generator 14.

In the signal generator 14, transmission frame is constructed including the transmission power control bit sent from the transmission power control bit decision unit 13, and outputted to the encoder 15. Encoded transmission signal is modulated in the modulator 16, spread in the spreader 17, and then outputted to the TX RF unit 18. In the TX RF unit 18, transmission signal which is frequency converted to IF and RF bands is transmitted at a transmission power based on control information outputted from the transmission power controller 20.

Figure 4:
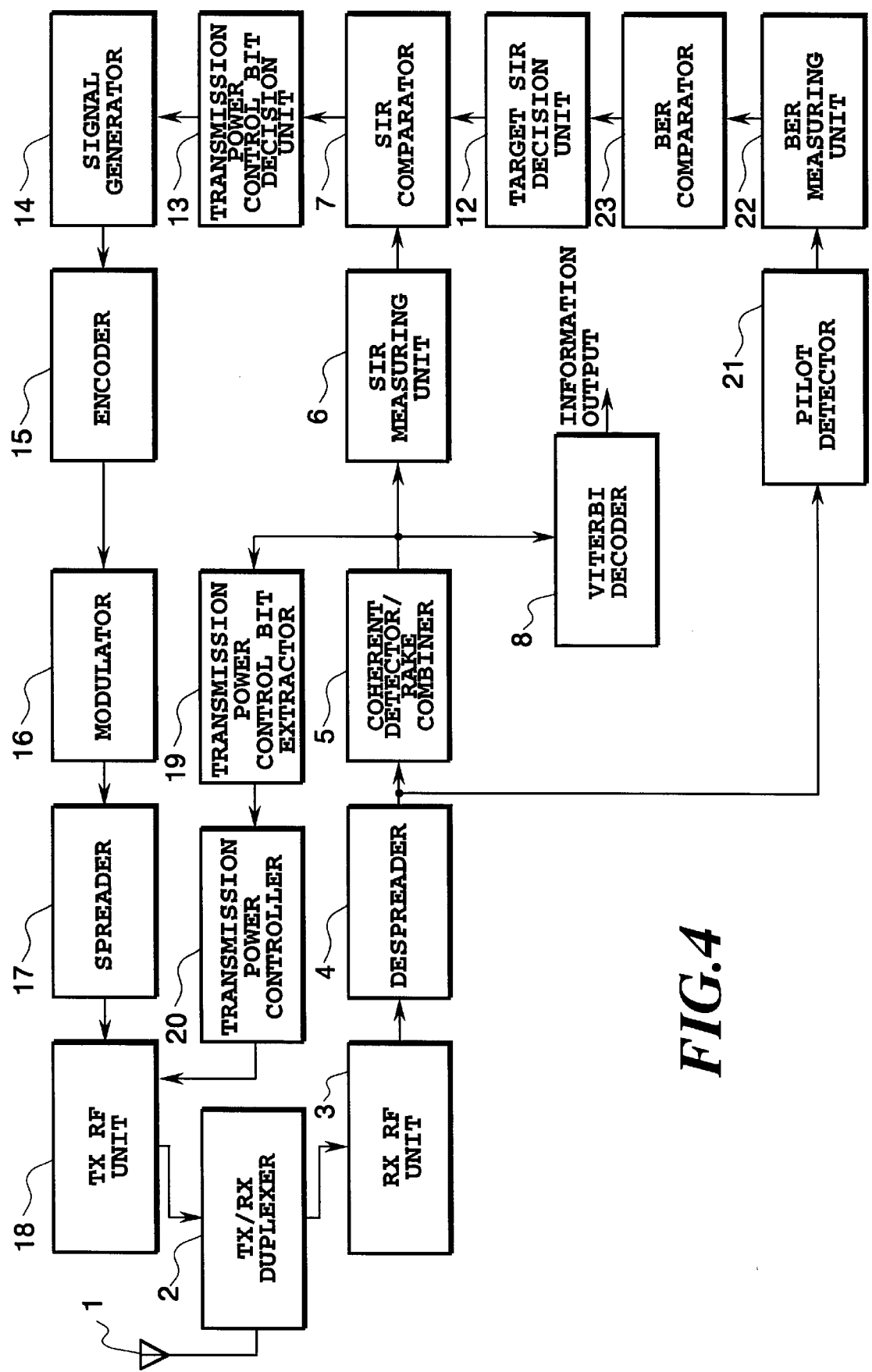
FIG. 4 is a diagram showing another embodiment of the transmission power controller.

FIG. 4 shows a transmitter/receiver apparatus incorporating another embodiment of the transmission power controller of the present invention. In FIG. 4, reference numeral 21 indicates a pilot signal detector, 22 is a bit error rate (BER) measuring unit, and 23 is a BER comparator. The same components as in FIG. 2 are indicated with the same symbols.

In the present embodiment, determination of the target SIR is made by a bit error rate (BER) of pilot signal. Specifically, in the pilot signal detector 21, a pilot signal which is known to both the base station and mobile station is detected from a despread signal, when the detected signal is different from the known signal, bit error detection information is outputted to the BER measuring unit 22.

The BER measuring unit 22 counts the number of pilot signal errors in an optional period (much longer than SIR measuring period in the SIR measuring unit 6) and outputs the BER measurement result to the BER comparator 23. In other words, the BER measuring unit 22 measures an average of error rate of pilot signal in a certain period. In the BER comparator 23, comparison is made with a preset target BER. As a result, the BER comparator 23 instructs the target SIR decision unit 12 to change the target SIR value.

Similar to the above-described FER measurement, measurement in the BER measuring unit 22 determines an average at every constant period to obtain a measurement result. However, by using the moving average also in the BER measurement, averaging time to determine BER error and target SIR control period can be made asynchronous with one another as described above.

The moving average of BER is given by $$BER(n) = \alpha \times BER(n-1) + (1-\alpha)ERR.$$

wherein n is a frame number, $\alpha$ is a forgetting factor, and ERR is a pilot signal error detection result, that is, it is 0 when pilot signal of the present n'th frame is normally detected, and 1 for error.

When the target SIR is changed, in addition to a dynamic changing method of the target value, it is also possible to increase or decrease by only a predetermined step width. In this case, when measured BER is smaller than the target BER, an instruction is made to the target SIR decision unit to decrease the target SIR by a predetermined value (step width), and when the measured BER is greater than the target BER, an instruction is made to the target SIR decision unit 12 to increase the target SIR by the predetermined value (step width).

UTILIZABILITY IN INDUSTRY

As described above in detail, it is possible to achieve transmission power control which provides the same channel quality irrespective of propagation environment and received SIR measurement accuracy.

What is claimed is:

1. A transmission power controller of at least one of a base station and a mobile station in a mobile communication system including said base station and said mobile station, comprising:
    means for measuring a received SIR (signal-to-interference plus noise power ratio);
    means for comparing a measurement result of said received SIR with a target value of SIR;
    means for outputting transmission power control information to an opposing station according to a result of said comparing of said measurement result of said received SIR with said target value of SIR;
    means for receiving and demodulating said transmission power control information;
    means for controlling transmission power of said opposing station according to said demodulated transmission power control information;
    means for detecting a CRC (cyclic redundancy check) bit added to a wireless frame signal, and outputting a frame error detection signal when a CRC bit is not detected;
    means for counting the number of said frame errors in a measuring time which is longer than a SIR measuring period, using said outputted detection signal;
    means for comparing said number of counted frame errors with a predetermined frame error number setting value; and
    means for changing said SIR target value according to a result of said comparing of said number of measured frame errors with said predetermined frame error number setting value, by either the base station or the mobile station.

2. A transmission power controller of at least one of a base station and a mobile station in a mobile communication system including said base station and said mobile station, comprising:
    means for measuring a received SIR (signal-to-interference plus noise power ratio);
    means for comparing a measurement result of said received SIR with a target value of SIR;
    means for outputting transmission power control information to an opposing station according to a result of said comparing of said measurement result of said received SIR with said target value of SIR;
    means for receiving and demodulating said transmission power control information;
    means for controlling transmission power of said opposing station according to said demodulated transmission power control information;
    means for detecting a CRC (cyclic redundancy check) bit added to a wireless frame signal, and outputting a frame error detection signal when a CRC bit is not detected;
    means for counting the number of said frame errors in a measuring time which is longer than SIR measuring period, using said outputted detection signal;
    means for determining a moving average of errors in an optional number of frames using said counted frame errors;
    means for comparing said moving average of said measured errors with a predetermined setting value of frame errors; and
    means for changing said SIR target value according to a result of said comparing of said moving average of said measured errors with said predetermined setting value of frame errors, by either the base station or the mobile station.

3. The transmission power controller as claimed in claim 1 or 2, wherein said means for changing said received SIR target value further comprises:
    means for making an instruction to decrease said SIR target value by a predetermined step width when a number of measured frame errors or a moving average thereof is smaller than a setting value; and
    means for making an instruction to increase said SIR target value by a predetermined step width when said number of frame errors or said moving average thereof is greater than a setting value.

4. A transmission power controller of at least one of a base station and a mobile station in a mobile communication system including said base station and said mobile station, comprising:
    means for measuring a received SIR (signal-to-interference plus noise power ratio);
    means for comparing a measurement result of said received SIR with a target value of SIR;
    means for outputting transmission power control information to an opposing station according to a result of said comparing of said measurement result of said received SIR with said target value of SIR;
    means for receiving and demodulating said transmission power control information;
    means for controlling transmission power of said opposing station according to said demodulated transmission power control information;
    means for detecting bit errors of known pilot signals inserted at a predetermined interval in a wireless frame, and outputting bit error detection information when the detected signal is different from the known signal;
    means for counting said number of bit errors in a measuring time which is longer than SIR measuring period, using said outputted bit error detection information;
    means for comparing said counted number of bit errors with a predetermined bit error number setting value; and
    means for changing said SIR target value according to a result of said comparing of said measured number of bit errors with said predetermined bit error number setting value, by either the base station or the mobile station.

5. A transmission power controller of at least one of a base station and a mobile station in a mobile communication system including said base station and said mobile station comprising:

means for measuring a received SIR (signal-to-interference plus noise power ratio);

means for comparing a measurement result of said received SIR with a target value of SIR;

means for outputting transmission power control information to an opposing station according to a result of said comparing of said measurement result of said received SIR with said target value of SIR;

means for receiving and demodulating said transmission power control information;

means for controlling transmission power of said opposing station according to said demodulated transmission power control information;

means for detecting bit errors of pilot signals inserted at a predetermined interval in a wireless frame signal, and outputting bit error detection information when the detected signal is different from the known signal;

means for determining a moving average of bit errors in an optional period, using said outputted bit error detection information;

means for comparing said moving average of bit errors with a predetermined setting value of bit errors; and means for changing said SIR target value according to a result of said comparing of said moving average of said measured errors with said predetermined setting value of bit errors, by either the base station or the mobile station.

6. The transmission power controller as claimed in claim 4 or 5, wherein said means for changing said received SIR target value further comprises:

means for making an instruction to decrease said SIR target value by a predetermined step width when a number of bit errors in measured pilot signals or a moving average thereof is smaller than a setting value; and means for making an instruction to increase said SIR target value by a predetermined step width when said number of bit errors or said moving average thereof is greater than a setting value.

7. The transmission power controller as claimed in claim 2, wherein said means for determining the moving average of errors calculates $$FER(n)=\alpha \times FER(n-1)+(1-\alpha) \times ERR$$

wherein FER is a frame error rate, n is a frame number, $\alpha$ is a forgetting factor, and ERR is a value indicating a pilot signal error detection result.

8. The transmission power controller as claimed in any one of claim 1, 2, and 7, wherein said means for changing said SIR target value further comprises:

means for making an instruction to decrease said SIR target value by a predetermined step width when a number of measured frame errors or a moving average thereof is smaller than a setting value; and means for making an instruction to increase said SIR target value by a predetermined step width when said number of frame errors or said moving average thereof is greater than a setting value.

9. The transmission power controller as claimed in claim 5, wherein said means for determining the moving average of errors calculates $$BER(n)=\alpha \times BER(n-1)+(1-\alpha) \times ERR$$

wherein BER is a bit error rate, n is a frame number, $\alpha$ is a forgetting factor, and ERR is a value indicating a pilot signal error detection result.

10. The transmission power controller as claimed in any one of claim 4, 5, and 9, wherein said means for changing said SIR target value further comprises:

means for making an instruction to decrease said SIR target value by a predetermined step width when a number of bit errors in measured pilot signals or a moving average thereof is smaller than a setting value; and means for making an instruction to increase said SIR target value by a predetermined step width when said number of bit errors or said moving average thereof is greater than a setting value.

* * * * *